United States Patent [19]

Orsino et al.

[11] 4,352,364
[45] Oct. 5, 1982

[54] NONSPILL VENTED CLOSURE ASSEMBLY FOR STORAGE BATTERY

[75] Inventors: Joseph A. Orsino, Diamond Bar; Ernest R. Sawyer, Solana Beach; Ronald J. Hollet, Glendora, all of Calif.

[73] Assignee: Concorde Battery Corp., West Covina, Calif.

[21] Appl. No.: 234,358

[22] Filed: Feb. 13, 1981

Related U.S. Application Data

[63] Continuation of Ser. No. 80,441, Oct. 1, 1979, abandoned.

[51] Int. Cl.³ .......................................... F16K 17/36
[52] U.S. Cl. .................................... 137/43; 137/197; 251/357; 429/85; 429/86
[58] Field of Search ................. 137/43, 197, 315, 316; 164/119; 429/85, 86; 251/339, 357

[56] References Cited

U.S. PATENT DOCUMENTS

| | | | |
|---|---|---|---|
| 2,181,157 | 11/1939 | Smith | 164/119 |
| 2,306,974 | 12/1942 | Oestermeyer | 429/85 |
| 2,405,736 | 8/1946 | Daily | 429/85 |
| 2,533,880 | 12/1950 | Donkin | 429/85 |
| 2,619,102 | 11/1952 | Endress | 429/85 |
| 2,717,610 | 9/1955 | Gill | 137/43 X |
| 2,769,452 | 11/1956 | Gill | 137/43 X |
| 2,894,524 | 7/1959 | Gill | 429/85 X |
| 2,981,272 | 4/1961 | Jammal | 429/85 |
| 3,507,708 | 4/1970 | Vignaud | 429/86 |
| 3,752,173 | 8/1973 | Karpal | 429/85 |

FOREIGN PATENT DOCUMENTS 646849  11/1950  United Kingdom ............... 251/357

*Primary Examiner*—Robert G. Nilson
*Attorney, Agent, or Firm*—Keith D. Beecher

[57] ABSTRACT

A nonspill vented closure assembly is provided for a wet cell type of storage battery which normally provides a venting hole to the interior of the battery, and which includes a tiltable weight that lifts a valve to close the vent hole whenever the battery is tilted with respect to the vertical beyond a certain angular displacement, so as to prevent leakage of the liquid electrolyte through the closure assembly. The closure assembly includes a tubular casing which is threaded into the normal fill hole of the battery. A lead weight which constitutes the tiltable mass is supported in the casing. A valve stem connects the lead weight to a valve member, and it serves to move the valve member against an annular valve seat surrounding an orifice in the lower end of the casing whenever the lead weight is tilted. The valve stem includes a ball at its upper end which extends into a cavity in the bottom of the lead weight, and which is held in the cavity by a plastic disc which forms a bearing surface for the ball. A cover is mounted on the other end of the casing, and a vent hole extends through the cover. A hydrophobic porous filter is mounted under the cover, and this filter forms a secondary barrier for preventing any liquid electrolyte from leaking through the vent. The casing is provided with an internal sloping shelf which supports the lead weight, the shelf having internal channels which serve as drainage means to permit and facilitate the free flow back into the interior of the battery of any liquid electrolyte in the closure assembly.

1 Claim, 3 Drawing Figures

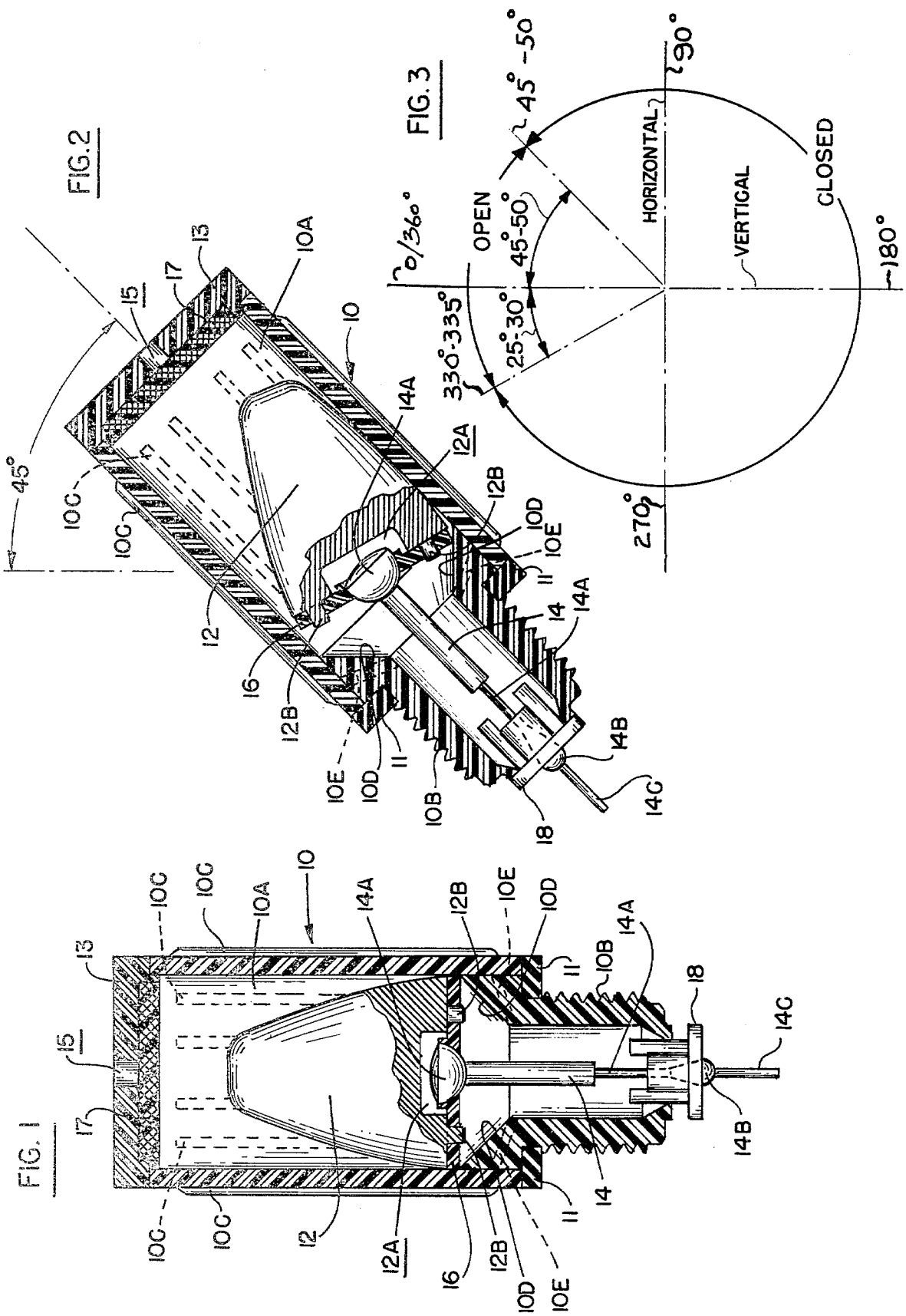

NONSPILL VENTED CLOSURE ASSEMBLY FOR STORAGE BATTERY

This application is a continuation of copending application Ser. No. 80,441 filed Oct. 1, 1979, now abandoned.

BACKGROUND

It is common practice in the wet cell storage battery art to provide plugs which are threaded, or otherwise fitted into the fill holes of present-day storage batteries. These plugs are vented so that gases developed within the battery, for example, during the charging operation, may escape. However, it is important that the corrosive liquid electrolyte within the battery does not leak out through the vents in the plugs, as such spillage has an adverse effect on surrounding surfaces and on personnel handling the batteries, as well as being wasteful of the electrolyte. This leakage problem is not too serious when the storage battery is operated in an upright position. However, there are many uses of storage batteries, such as in aircraft, water vessels, racing cars, and the like, in which the batteries are subject to violent action, to being tilted away from their normal upright position, and of actually being inverted for substantial periods of time. For such uses, it is common practice in the prior art to provide nonspill plugs having internal tiltresponsive valve mechanisms for the fill holes of the such batteries. Various types of nonspill plugs are known to the art, and are described, for example, in U.S. Pat. Nos. 2,306,974; 2,717,610; and 3,752,173.

As described, for example, in U.S. Pat. No. 3,752,173, one form of nonspill vent plug known to the art includes a tubular casing which, in turn, includes an inwardly projecting shoulder that divides the interior of the casing into an upper portion and a lower portion. A tiltable weight is positioned in the upper portion of the casing, and it is supported on the shoulder. A valve stem is secured to the tiltable bottom of the weight, the valve stem projecting downwardly through the lower portion of the casing and through an opening in the lower end of the casing. Whenever the axis of the prior art plug is tilted a predetermined angular distance away from the vertical, the weight tilts relative to the casing, and in so doing pulls the valve stem upwardly to close a valve supported on the lower end of the valve stem against a valve seat surrounding the opening in the lower end of the casing. This action seals the opening, thereby preventing electrolyte in the battery from leaking out through the plug when the battery is so tilted. It is also usual in such prior art plugs to provide a ball and socket joint between the tiltable weight and the valve stem, this being achieved by providing a cavity in the bottom of the weight which has a mating spherical surface with the ball at the top of the valve stem.

The principal objective of the present invention is to provide a closure assembly of the general type described in the preceding paragraph, but one which is constructed in an improved manner so that closure of the assembly is assured, without any likelihood of sticking, whenever the assembly is tilted beyond a predetermined angular threshold with respect to the vertical; and so as to assure that the closure assembly, at no time, will allow any liquid electrolyte to leak from the battery. The assembly of the invention is also constructed to be readily and economically manufactured, and to operate reliably over long periods of time.

Specifically, the main objectives of the present invention are to provide a closure assembly for wet cell storage batteries, which may be manufactured on a commercially feasible basis, and which operates to vent gases from the interior of the battery, and to provide a complete and positive closure when the battery is tilted even slightly from its upright position, and throughout all other positions of the battery, to minimize any leakage of liquid electrolyte from the battery.

In meeting the foregoing objectives, the closure assembly of the invention reduces the hazards which presently accompany the use of storage batteries, in that the corrosive electrolyte is maintained within the battery, despite violent movements of the battery, and short-circuiting electrical paths created by the escape of the electrolyte are also minimized. Moreover, the closure assembly of the invention serves to reduce the frequency with which fresh electrolyte and water must be added to the battery thereby reducing the maintenance requirements of the battery.

The closure assembly of the invention is actuated by a tiltable lead weight which is shaped in the form of a truncated cone, and which provides uniformity of valve closure for any attitude of the storage battery angularly displaced from the vertical beyond a predetermined threshold, this being achieved by maximizing the density of the lead weight and obviating the effect of imperfections or blow holes therein. The closure assembly of the invention also includes other features, such as a plstic disc which is attached to the lead weight, which forms a bearing surface for a ball joint within the assembly, and which assures accurate and reliable operation of the assembly whenever a tilt occurs beyond the presdetermined threshold. The closure assembly of the invention also includes a hydrophobic porous filter which acts as a secondary barrier to prevent any liquid from leaking through the closure under any condition.

BRIEF DESCRIPTION OF THE DRAWINGS

FIG. 1 is a side view, partly in section, showing one embodiment of a closure assembly constructed in accordance with the concepts of the invention, when the closure is positioned in an upright position, in which a valve in the assembly is open so that gases may enter its interior to be vented through the closure;

FIG. 2 is a view, like FIG. 1, in which the closure assembly of FIG. 1 is tilted beyond a predetermined threshold, so that the valve is drawn to a closed state to prevent any liquid from entering the closure; and FIG. 3 is a diagram illustrating the open and closed condition of the closure assembly of FIGS. 1 and 2, as the battery in which it is mounted is rotated through an arc of 360°.

DETAILED DESCRIPTION OF THE ILLUSTRATED EMBODIMENT

As shown in FIGS. 1 and 2, the nonspill vented closure assembly of the invention includes a tubular casing 10 formed, for example, of hard rubber, or appropriate plastic. The casing 10 has an upper portion 10A which forms a housing for a tiltable lead weight 12, and the casing has a lower portion 10B of reduced diameter. Portion 10B has external threads so that the closure assembly may be screwed, for example, into the fill hole of a wet cell storage battery. A rubber washer 11 surrounds portion 10B adjacent to the shoulder formed by portion 10A to act as a gasket. The outer surface of the casing 10 may be provided with vertical ribs 10C to facilitate the insertion and removal of the closure assembly into the fill hole of the battery. The lead weight 12 is supported on an internal sloping integral ledge 10D of the casing. Channels 10E are formed in the surface of the ledge 10D to drain back into the battery any liquid which may enter, or be formed in, the interior of the closure assembly.

The tiltable lead weight 12 is precision formed into the shape of a truncated cone. In forming the weight 12, for example, it is first cast from molten lead, or from molten lead alloy, and it is then pressed into final shape by means of pressures exceeding, for example, 20,000 psi. These pressures increase the density of the lead in the weight, and serve to remove any imperfections in the casing, such as shrinkage areas and blow holes.

The tubular casing 10 has an open top which is closed by a cover 13, the cover having a vent hole 15 at its center. The cover is sealed to the casing by a suitable adhesive, by ultrasonic welding, or by any other appropriate means.

An hydrophobic porous filter disc 17 with a pore size ranging, for example, of from 1-10 microns, is mounted in the casing adjacent to the underside of cover 13, and the filter disc serves as a secondary barrier to prevent the leakage of any liquid electrolyte through the closure assembly. The filter disc may be constructed from polyethylene pellets which are compacted and sintered together. The purpose of the filter disc is to pass only gases such as hydrogen and oxygen to the vent 15, and to cause all liquids, such as the electrolyte, to be repelled and returned to the battery.

A cavity 12A is precision formed in the bottom of the lead weight 12. A ball-shaped head 14A of a plastic valve stem 14 is positioned in the cavity 12A, and the head is retained in the cavity by a plastic disc 16. Disc 16 is attached to the bottom of the lead weight by pins 12B which are integral with the lead weight and which extend through holes in the disc. As shown in FIGS. 1 and 2, an opening is formed in the center of the disc, and the ball 14A bears against the surface of the disc surrounding the opening, and which forms a bearing surface for the ball. The bearing surface has a spherical shape complementing the shape of the ball, thereby providing a free acting ball joint, and a joint which has no tendency to stick, as the lead weight 12 is tilted from the position shown in FIG. 1 to the position shown in FIG. 2.

The lower end 14A of valve stem 14 has a reduced diameter, and it extends through a pliable, synthetic plastic, rubber-like, acid-resistant valve member 18. Valve member 18 has a disc-shaped portion, and it also has a further longitudinally ribbed portion integral with the disc-shaped portion. The member has, for example, a Shore hardness factor of about 20. When the closure assembly is in its closed position, as shown in FIG. 2, the disc-shaped portion of the valve member 18 is pulled against a flat annular valve seat which surrounds an orifice in the lower end of the casing. The outer diameter of the disc-shaped portion of member 18 is greater than the inner diameter of the valve seat. The further ribbed portion of the valve member extends through the orifice into the interior of the casing, as shown.

The valve member 18 is mounted on portion 14A of valve stem 14, the valve stem passing through a hole in the center of the member 18. Downward axial movement of the valve member on portion 14A of the stem 14 is prevented by a knob 14B, which is integral with the stem. The clearance between the stem and the hole in valve member 18 is small and critical, which normally makes it difficult to insert the knob 14B through the hole in the valve 18 without damage to the resilience and integrity of the valve. The insertion of the stem and knob through the valve is facilitated by providing an extension 14C at the lower extremity of the stem. During assembly, the extension is inserted through the hole in valve 18, and then the knob 14B is pulled through the hole in the valve by pulling the extension with any suitable tool. The extension may be cut off when the closure assembly is completed.

As shown in FIG. 1, when the closure assembly is in its upright position the lead weight 12 and disc 16 rest on the sloping edge 10D of the tubular casing 10. The lead weight is now, likewise, in an upright position, and the valve stem 14 suspends the valve closure member 18 in an open position displaced from the lower end of casing 10. In that position of the assembly, gases are free to pass into and through the closure assembly 10, through filter 17, and through vent hole 15. Any liquid electrolyte, or other liquid, however, is repelled by the filter 17 and flows through the channels 10E in ledge 10D back into the battery, so that even when the closure assembly is in its upright, valve-open, position, the leakage of liquids through the closure is inhibited.

The electrolyte level in a typical wet cell storage battery is usually adjusted to a height of about 0.25 inches above the highest point of the plate-separator system of the battery. Such a battery may be inclined to about 45° from its normal upright position before any electrolyte spillage is likely to occur. When the closure assembly of the present invention is used in conjunction with the battery, such an angular displacement of the battery causes the closure assembly to assume the position shown in FIG. 2. In the position of FIG. 2, and because of the position of the center of gravity of the lead weight 12, the inclination of the assembly causes the lead weight 12 to tilt. When that occurs, the ball-joint motion between ball 14A and disc 16 causes the valve stem 14 to pull the valve member 18 upwardly against the valve seat around the orifice in the lower end of casing 10, effectively preventing any liquid from flowing into the casing 10. The closure of the valve is effective, and absolute, from about 45° to 335° when the battery is rotated through a complete 360° arc, such as might happen in an airplane as it goes through a complete barrel roll, this being represented by the diagram of FIG. 3. The configuration of valve member 18 assures free flow of gases into the casing 10 when the assembly is in the position of FIG. 1, and complete stoppage when the assembly is in the position of FIG. 2, without any tendency for the valve member 18 to cock.

With further reference to FIG. 3, the vent plug valve will open when the attitude reaches the 330° to 335° position. The opening mechanism is a two stage process. During the first stage the knob 14B is forced downward by the lead weight 12 which has returned to a vertical position, releasing any gas pressure build-up which may reach as much as 10 PSI. Unless such a pressure release is accomplished during this first stage no further opening of valve member 18 is possible since the upward force of the gas pressure exceeds the downward force of the lead weight. This initial opening relieves the built-up gas pressure. In the absence of such pressure the lead weight may now cause the valve mechanism to drop into its lowest position, thereby preventing any further gas pressure increase. In this normally open position any accumulated electrolyte fluid is returned to the battery cell.

The invention provides, therefore, an improved vented closure assembly for a storage battery which is relatively inexpensive to construct, and which operates with a high degree of precision and reliability to close, and to remain closed, whenever the battery is tilted beyond a predetermined threshold, so that the leakage of liquid electrolyte from the battery is reduced to an absolute minimum.

It will be appreciated that while a particular embodiment of the invention has been shown and described, modifications may be made. It is intended in the following claims to cover all embodiments which fall within the true spirit and scope of the invention.

What is claimed is:

1. A nonspill closure assembly for a wet cell storage battery comprising: a casing having an orifice at one end thereof and forming an annular valve seat around the orifice; a cover mounted at the other end of the casing having a vent hole therein; a tiltable lead weight supported in said casing, said weight having a cavity formed in the bottom thereof; a disc mounted on the bottom of said lead weight enclosing said cavity, said disc having an opening therein of a diameter less than the diameter of the cavity; a valve stem having a ball-like member formed on one end thereof, said ball-like member being positioned in said cavity and supported on said disc, with the portion of said disc surrounding said cavity forming a bearing surface for the ball, and with the stem extending through the opening in the disc; a valve member mounted on said arm in position to be drawn against said annular valve seat when the lead weight tilts away from its vertical position; and an hydrophobic porous filter mounted in said casing adjacent to the underside of said cover to prevent any liquid from leaking through the vent hole in said cover.

* * * * *